(12) United States Patent
Zou

(10) Patent No.: US 11,083,980 B2
(45) Date of Patent: Aug. 10, 2021

(54) ROTARY SOLID/FLUID COUNTER-CURRENT CONTACTING APPARATUS

(71) Applicant: Baisheng Zou, Pearland, TX (US)

(72) Inventor: Baisheng Zou, Pearland, TX (US)

( * ) Notice: Subject to any disclaimer, the term of this patent is extended or adjusted under 35 U.S.C. 154(b) by 791 days.

(21) Appl. No.: 15/856,798

(22) Filed: Dec. 28, 2017

(65) Prior Publication Data

US 2018/0250609 A1    Sep. 6, 2018

Related U.S. Application Data

(63) Continuation-in-part of application No. 15/449,866, filed on Mar. 3, 2017, now Pat. No. 10,589,190.

(51) Int. Cl.
| | |
|---|---|
| *B01D 15/02* | (2006.01) |
| *F16K 11/074* | (2006.01) |
| *F28D 17/04* | (2006.01) |
| *B01D 15/36* | (2006.01) |
| *B04B 5/06* | (2006.01) |

(52) U.S. Cl.
CPC .......... *B01D 15/02* (2013.01); *B01D 15/361* (2013.01); *B04B 5/06* (2013.01); *F16K 11/074* (2013.01); *F28D 17/04* (2013.01)

(58) Field of Classification Search
CPC ....... B01D 15/02; B01D 15/361; F28D 17/04; B04B 5/06
USPC .............. 494/22; 210/676, 264; 137/625.15, 137/625.21, 625.31
See application file for complete search history.

(56) References Cited

U.S. PATENT DOCUMENTS

| | | | | |
|---|---|---|---|---|
| 3,201,491 A | * | 8/1965 | Broughton | C11D 3/48 210/676 |
| 3,422,848 A | * | 1/1969 | Carson | F16K 11/0743 137/625.15 |
| 3,706,812 A | * | 12/1972 | Derosset et al. | B01D 53/0446 585/822 |
| 4,372,337 A | | 2/1983 | Holzenberger | |
| 5,069,883 A | * | 12/1991 | Matonte | B01D 15/02 422/269 |
| 5,478,475 A | * | 12/1995 | Morita | B01D 15/14 137/625.15 |
| 5,676,826 A | * | 10/1997 | Rossiter | B01D 15/1892 210/91 |
| 6,155,334 A | | 12/2000 | Steele | |
| 6,261,458 B1 | * | 7/2001 | Callebert | B01D 15/1842 208/310 R |
| 6,431,202 B1 | * | 8/2002 | Ahlgren | F16K 11/0743 137/312 |
| 6,527,946 B1 | * | 3/2003 | Wijnberg | B01D 15/1892 210/91 |

(Continued)

*Primary Examiner* — Charles Cooley

(57) ABSTRACT

A rotary counter-current solid/fluid contact apparatus is developed to enhance the efficiency of adsorption, ion exchange and regenerative heat exchange. The counter-current apparatus uses a rotor to direct fluids to multiple stationary columns. By the action of the rotor, counter-current flows of a fluid phase and a solid phase can be achieved for a combined adsorption and desorption cycle, or a combined heating and cooling cycle. The apparatus allows not only countercurrent solid-fluid flows based on columns in series, but also countercurrent solid-fluid flows in the length of each individual column. A method is also disclosed.

10 Claims, 7 Drawing Sheets

(56) References Cited

U.S. PATENT DOCUMENTS

| | | | | |
|---|---|---|---|---|
| 6,537,451 B1* | 3/2003 | Hotier | ............... | B01D 15/1842 |
| | | | | 137/625.11 |
| 6,802,970 B2* | 10/2004 | Rochette | ................. | B01J 47/00 |
| | | | | 210/264 |
| 6,904,936 B2* | 6/2005 | Ma | ....................... | F16K 11/076 |
| | | | | 137/625.11 |
| 7,141,172 B2* | 11/2006 | Wang | ................ | B01D 15/1842 |
| | | | | 210/659 |
| 8,985,151 B1* | 3/2015 | Zou | ........................ | F16K 11/00 |
| | | | | 137/874 |
| 9,120,049 B2* | 9/2015 | Sundaram | ........ | B01D 53/0446 |
| 10,589,190 B2* | 3/2020 | Zou | ..................... | B01D 15/361 |
| 2004/0099592 A1* | 5/2004 | Rochette | ................. | B01J 47/11 |
| | | | | 210/264 |
| 2012/0111435 A1* | 5/2012 | Antonetti | .............. | F16K 11/074 |
| | | | | 137/625 |
| 2018/0250608 A1* | 9/2018 | Zou | ........................ | B01D 15/02 |
| 2018/0250609 A1* | 9/2018 | Zou | ........................ | F28D 17/04 |

* cited by examiner

ROTARY SOLID/FLUID COUNTER-CURRENT CONTACTING APPARATUS

CROSS-REFERENCE TO RELATED APPLICATIONS

The present application is a continuation-in-part of U.S. application Ser. No. 15/449,866, filed on Mar. 3, 2017, which issued on Mar. 17, 2020 as U.S. Pat. No. 10,589,190.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the field of rotary fluid distribution. More particularly, the present invention relates to a rotor and a matching stator that can be used to distribute fluid in continuous countercurrent regenerative heat exchange, ion exchange and adsorption/desorption columns. The present invention also relates to a method of counter-current flow for the above purposes.

2. Description of Related Art Including Information Disclosed Under 37 CFR 1.97 and 37 CFR 1.98

The main bodies of certain classes of process equipment need to be regenerated or renewed after a certain time period of operation. This equipment can include regenerative heat exchangers, regenerative thermal oxidizers, moving bed (simulated or real) chemical reactors/chromatographic separators, adsorption/desorption columns, ion exchange columns and regenerative air dehumidifiers. The regeneration methods include rotating the main body of the equipment or switching on and off a multitude of valves so that different sections of the main body can be contacted by different kinds of fluids at different times. The present invention attempts to optimize continuous countercurrent operation for such a multitude of processes.

For continuous operations of mass transfer from one phase to another, counter-current operation is more efficient than co-current or crossflow operations. The counter-current operation can be easily implemented if both phases are fluids but immiscible to each other, since fluids can be pumped around and flow easily.

If one material is a solid and another material is a fluid, counter-current flow becomes more difficult, since moving solid within a vessel or transporting solid from one vessel to another can present mechanical and efficiency problems.

U.S. Pat. No. 5,676,826 issued to Rossiter and Riley disclosed a fluid-solid contacting apparatus employing a rotary valve to conduct fluid streams to and from the apparatus. The fluid-solid contacting apparatus of such a design comprises a plurality of chambers containing solid, with chambers installed on a turntable. While such a design can achieve counter-current solid-fluid contact, a turntable loaded with chambers may cause mechanical difficulties when the size of chambers becomes large and heavy.

U.S. Pat. No. 6,431,202 describes a rotary valve with mechanical improvement over the apparatus of U.S. Pat. No. 5,676,826, but it still requires a turntable.

U.S. Pat. Application 20120111435 discloses a turntable-less rotary fluid distributor design which is however mechanically complex, and cumbersome for large fluid flows.

U.S. Pat. No. 8,985,151 discloses a rotary fluid distribution apparatus which does not require a turntable for fluid distribution and direction. However, the solid-fluid contact pattern disclosed are mainly crossflows, not true counter-current flows.

It is an object of the present invention to provide a simple fluid distribution apparatus with improvement over rotor designs of U.S. Pat. No. 8,985,151, and achieve true counter-current contact patterns for solid phases and fluid phases.

U.S. Pat. Nos. 6,537,451, 3,422,848 and 3,040,777 also disclose rotary valves that direct different fluid streams to different outlets for solid-fluid contacting and reaction. The present invention is however more efficient in terms of solid-fluid counter-current operations.

BRIEF SUMMARY OF THE INVENTION

One embodiment of the present invention is a rotary fluid distribution apparatus having a rotor having a rotor plate, a plurality of external pipes fixed above the rotor plate, and a plurality of internal pipes, the external pipes opening to a bottom surface of the rotor plate, the plurality of internal pipes extending downwardly from the bottom surface of the rotor plate. A stator is provided having a head and a plurality of external pipes. The plurality of internal pipes of the rotor being received in an interior of the head. The plurality of external pipes of the stator open to the bottom surface of the rotor plate so as to align with the plurality of external pipes of the rotor. A plurality of columns are connected to the plurality of external pipes of the stator, the plurality of columns being packed with a solid material, wherein each of the plurality of columns is connected at a top end to one of the plurality of external pipes of the stator and connected at a bottom end to another of the plurality of external pipes of the stator. The head of the stator preferably has a plurality of chambers therein, each of the chambers of the head having a nozzle in fluid communication therewith. The nozzle is suitable for introducing or removing a fluid from the apparatus. Each of the chambers is in fluid communication with one of the plurality of internal pipes of the stator.

In an embodiment, a stator plate is provided and forms a top surface of the stator. The stator plate having openings therein in fluid communication with the plurality external pipes of the stator.

In an embodiment, the plurality of external pipes of the rotor include a set of external pipes oriented to establish downward flow through respective columns of the plurality of columns to which the set of external pipes is in fluid communication with; a first pair of external pipes oriented to purge a column of the plurality of columns to which the pair of external pipes is in fluid communication with; a set of external pipes oriented to establish upward flow through respective columns of the plurality of columns to which the set of external pipes is in fluid communication with; and a second pair of external pipes oriented to purge a column of the plurality of columns to which the pair of external pipes is in fluid communication with. The rotor is preferably rotatable relative to the stator so as to selectively establish an upward flow, a downward flow or a purge in a particular column of the plurality of columns. Preferably, a set of columns wherein an upward flow is established and another set of columns wherein a downward flow is established, with one set for adsorption and another set for desorption.

Preferably, the orientation of the set of external pipes oriented to establish downward flow is a mirror image of the set of external pipes oriented to establish upward flow. The mirror image is preferably cut along a line formed by openings in the rotor associated with the first and second pairs of external pipes oriented to purge a column.

In an embodiment of the present invention, the plurality of chambers of the head of the stator are separated by a plurality of separation plates of the rotor, and each of the internal pipes of the rotor extend through one or more of the plurality of separation plates so as to open in a respective chamber of the stator.

In the present invention, the solid material of the plurality of columns may be a thermal energy transfer medium or a mass transfer medium.

In an embodiment, each of the nozzles of the stator has a tube extending outwardly therefrom.

In an alternative embodiment of the present invention, the plurality of columns takes the form of a single column having a plurality of sections.

The present invention is also a counter-current rotary fluid distribution apparatus including a rotor having a plurality of internal fluid passageways and external fluid passageways, the plurality of external fluid passageways opening to a bottom surface of the rotor plate. A stator having a head is provided. The head has a plurality of external fluid passageways opening to the bottom surface of the rotor plate so as to align with the plurality of external fluid passageways of the rotor. A plurality of columns are connected to the plurality of external fluid passageways of the stator, wherein each of the plurality of columns is connected at a top end to one of the plurality of external fluid passageways of the stator and connected at a bottom end to another of the plurality of external fluid passageways of the stator. The plurality of external fluid passageways of the rotor include: (a) a first set of fluid passageways oriented to flow a fluid through one or more of the plurality of columns in a top-to-bottom direction; and (b) a second set of fluid passageways oriented to flow another fluid through one or more of the plurality of columns in a bottom-to-top direction. The plurality of fluid passageways of the rotor may also include: (c) a third set of fluid passageways oriented to flow a purge fluid through one of the plurality of columns so as to exit the apparatus without being flowed through another column.

In an embodiment, the stator has a head with a plurality of chambers therein, each of the chambers of the head having a nozzle in fluid communication therewith, the nozzle being suitable for introducing or removing a fluid from the apparatus, each of the chambers being in fluid communication with one of the plurality of internal fluid passageways of the rotor.

The present invention is also a method for counter-current rotary fluid distribution in an apparatus, the apparatus having a rotor with a plurality of external fluid passageways, and a plurality of columns in fluid communication with the plurality of external fluid passageways of the rotor, the external fluid passageways of the rotor arranged to provide either a top-to-bottom flow or a bottom-to-top flow through a column. The method comprises the steps of: passing a fluid into one of the external fluid passageways of the rotor; flowing the fluid from the one of the external fluid passageways of the rotor into a top of one of the plurality of columns such that the fluid flows from the top of the column to the bottom of the column; returning the fluid from the bottom of the one of the plurality of columns to a top section of another of the plurality of columns; removing the fluid from the apparatus; and rotating the rotor such that the fluid passageways of the rotor are oriented to flow another fluid through the one of the fluid passageways from the bottom of the column to the bottom of the column.

In the method of the present invention, the apparatus preferably has a stator with a plurality of chambers in fluid communication with the internal fluid passageways of the rotor. In this embodiment, the step of passing comprises: passing the fluid into one of the plurality of chambers of the stator so as to flow into one of the fluid passageways of the rotor.

In the method of the present invention, the step of removing may comprise: flowing the fluid from the bottom of the another of the plurality of columns through a fluid passageway of the rotor to a chamber of the stator; and removing the fluid from the chamber.

In the method of the present invention, the fluid passageways of the rotor may preferably be arranged to purge a column, the method further comprising the steps of: rotating the rotor such that the fluid passageways of the rotor are oriented to purge the one of the plurality of columns; flowing a purge fluid into the one of the plurality of columns through a chamber of the stator and a fluid passageway of the rotor; and removing the purge fluid from the apparatus with or without flowing it through the another of the plurality of columns.

This foregoing Section is intended to describe, with specificity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

The rotor design of such a fluid distribution apparatus is similar to that of U.S. Pat. No. 8,985,151 to the present inventor. However, two new rotor components are added: a rotor plate and rotor external pipes. The combination of the rotor and stator, interconnecting process pipes and multiple columns creates a system for counter-current solid-fluid mass transfer or heat transfer operations.

The apparatus uses a solid to extract thermal energy or selected material from a process stream, and uses a regeneration stream to regenerate the used solid. The thermal energy or selected material is transferred eventually from the process stream to the regeneration stream, with the solid as the transfer medium. The solid loaded columns are stationary. However, the rotary motion of a center rotor creates a simulated solid motion that makes solid-fluid counter-current flows possible.

Figure 1:
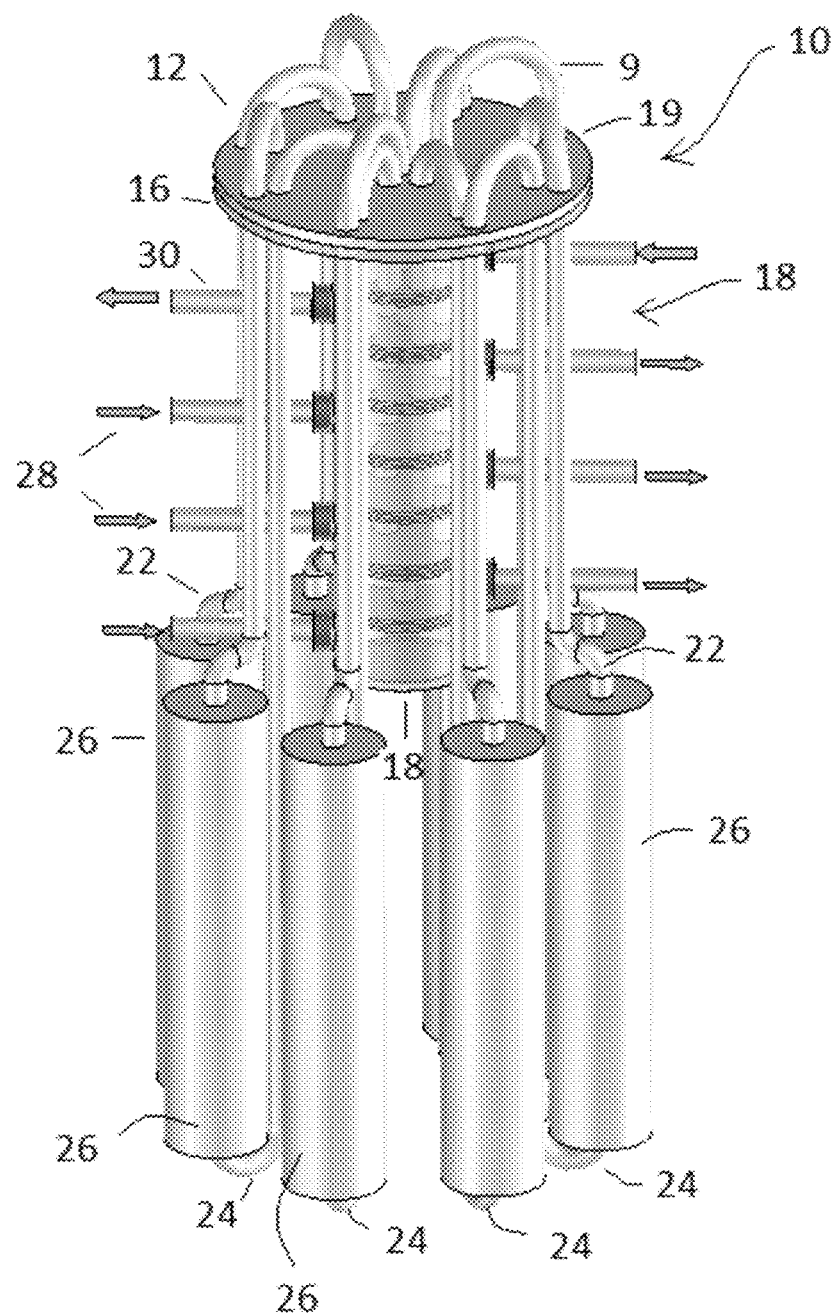
FIG. 1 is a perspective view, partially transparent, of the countercurrent adsorption/heat transfer apparatus of the present invention.

Referring to FIG. 1, an apparatus 10 comprises multiple stationary parts and a rotor 12. When in operation, the stationary parts will be motionless and the rotor 12 will rotate continuously or intermittently at a specified speed. External pipes 9 of the rotor 12 receive fluids from internal pipes and transfer fluids to the openings of the stator plate 16. Within the concept of the present invention, external and internal pipes can take the form of any type of fluid passageways, including tubes, bores, etc.

The stationary parts shown in FIG. 1 comprise a top head 18, a stator plate 16, multiple feed pipes 30, external pipes 22 and 24, multiple columns 26, and feed and regeneration sources 28. Columns 26 are all packed with solid material (not shown for clarity) used as either a thermal energy or a mass transfer medium.

Figure 2:
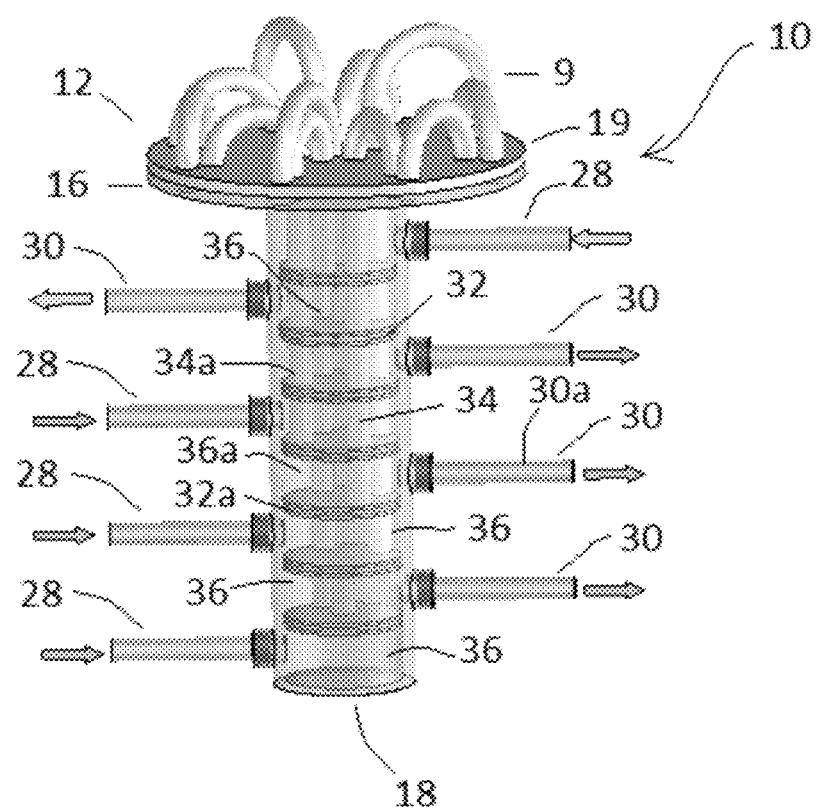
FIG. 2 is a perspective view, partially transparent, of the apparatus of the present invention wherein the columns and external stator pipes are omitted for clarity.

FIG. 2 is a partially transparent perspective view of the rotor 12 and the stator head 18. Four feed nozzles 28 and four product nozzles 30, rotor plate 19, separation plates 32, rotor internal and external pipes (34 and 9) are shown.

FIG. 2 particularly illustrates how fluid is routed through the stator head 18 of the apparatus 10 of the present invention. The stator head 18 of the present invention is structurally very similar to the head of the apparatus of applicant's previous U.S. Pat. No. 8,985,151. In FIG. 2, it can be seen how the internal pipe 34a passes from the stator plate 16 through the plurality of separation plates 32 so as to open into the chamber 36a formed above the separation plate 32a. In the example shown in FIG. 2, feed or product (a fluid) running through the internal pipe 34a would thus exit the stator head 18 through feed nozzle 30a, the feed nozzle 30a being associated with the chamber 36a. Note that the various other internal pipes 34 travel through the separation plates 32 so as to terminate in respective chambers 36. As can be appreciated, rotation of the rotor 12 relative to the stator plate 16 and stator head 18 would change the angular position of the particular external pipe 9 through which the product or feed flowing through the respective internal pipe 34 flows.

Figure 3:
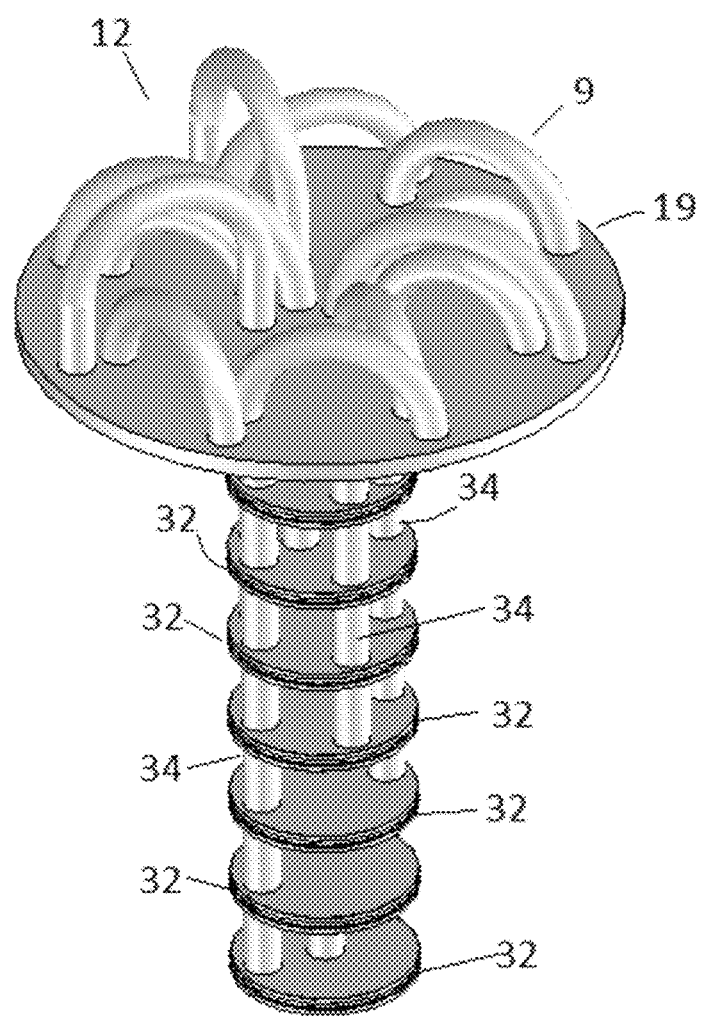
FIG. 3 is a perspective view illustrating, in particular, the rotor plate, separation plates internal and external pipes of the rotor.

The rotor 12 can be removed from the stator head 18 and is easily viewed in FIG. 3. Note that the head 18 is stationary. The rotor has a plurality of separation plates 32. The separation plates 32 together with the external wall of the stator head 18 separate different fluids when the latter are entering or leaving the apparatus 10. There are multiple internal pipes or fluid passageways 34 that are used to direct or withdraw fluid. External pipes 9 are at the opposite side internal pipes 34 with respect to the rotor plate 19 and make U turns to return to openings at the outer circumference of the rotor plate 19.

Figure 4:
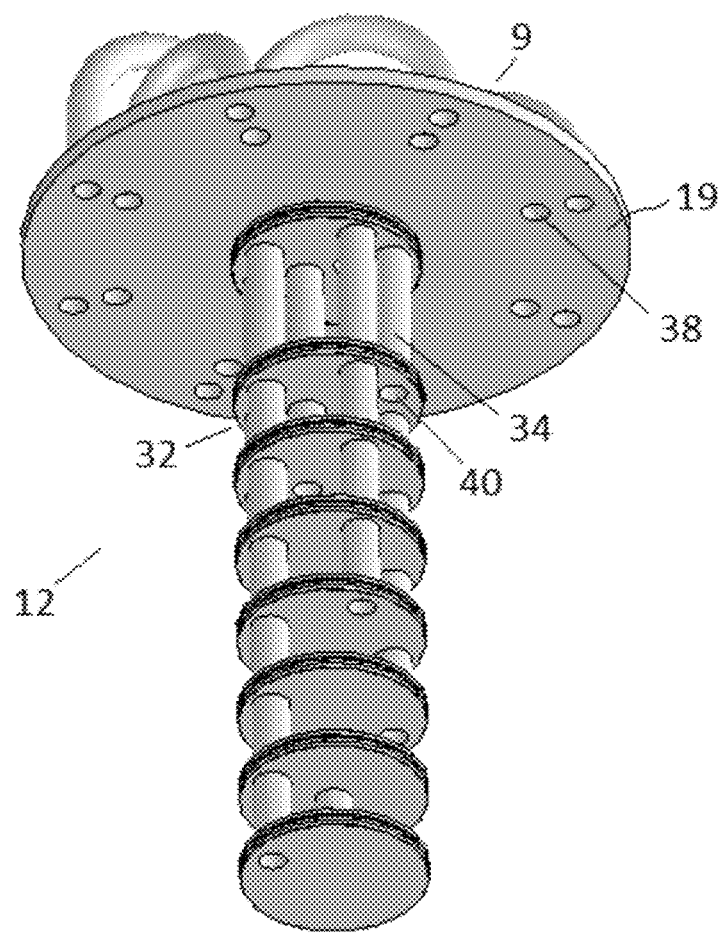
FIG. 4 is a perspective view of the rotor viewed from lower side.

FIG. 4 is a perspective view of the rotor 12 viewed from the lower side. The opening 40 on separation plate 32, and opening 38 on rotor plate 19 can be seen clearly. A fluid stream can return from a column, flow through opening 38, then external pipe 14, then internal pipe 34, then opening 40, and exit the head 18 and the apparatus 10.

Figure 5:
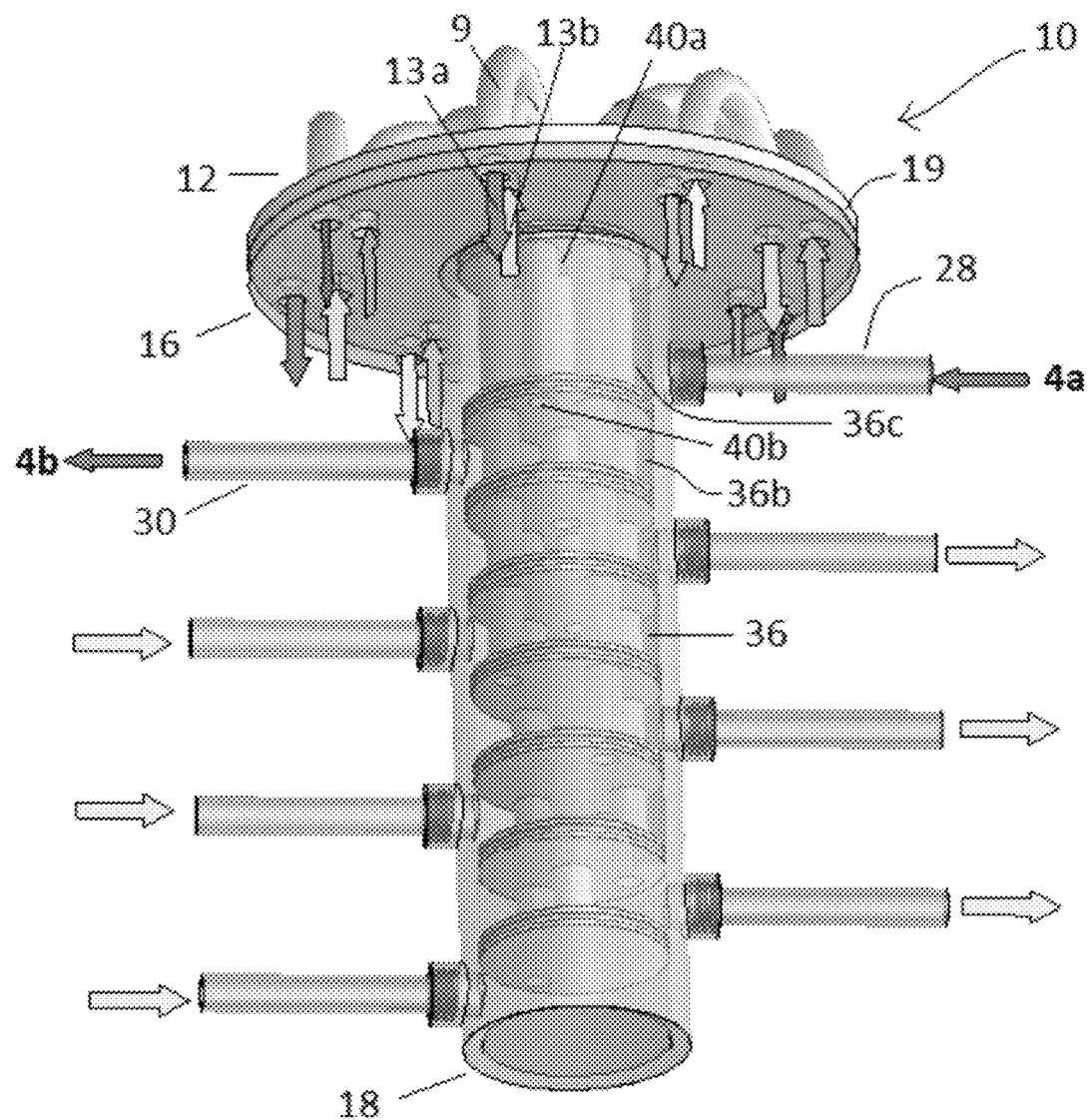
FIG. 5 is a lower perspective view, partially transparent, of the rotor, the stator head and the stator plate illustrating directions of fluid flow.

FIG. 5 is a partially transparent perspective view of the rotor 12 and head 18 viewed together from the lower side. Here, the rotor 12 has rotated 90 degrees from the position shown in FIG. 4. A purge stream 4a enters the first fluid section (or chamber 36) through a pipe and a nozzle 28, exits the first fluid section 36 through opening 40a on the first separation plate, flows through external pipe 9, and exits the matching rotor and stator plates as stream 13a. Stream 13a flows into a column, vertically from top to bottom (as shown in FIG. 1), and returns as stream 13b. Stream 13b flows through a rotor external and an internal pipe, and exits to the second fluid section 36b through opening 40b. The fluid in the second fluid section 36b exits the whole apparatus through pipe 30 as stream 4b. As the rotor rotates, all the columns in the system are cleaned sequentially by purge stream 4a.

The location of openings on the rotor plate and the connection of rotor external pipes must follow certain rules in order to optimize the solid/fluid counter-current operation.

Figure 6:
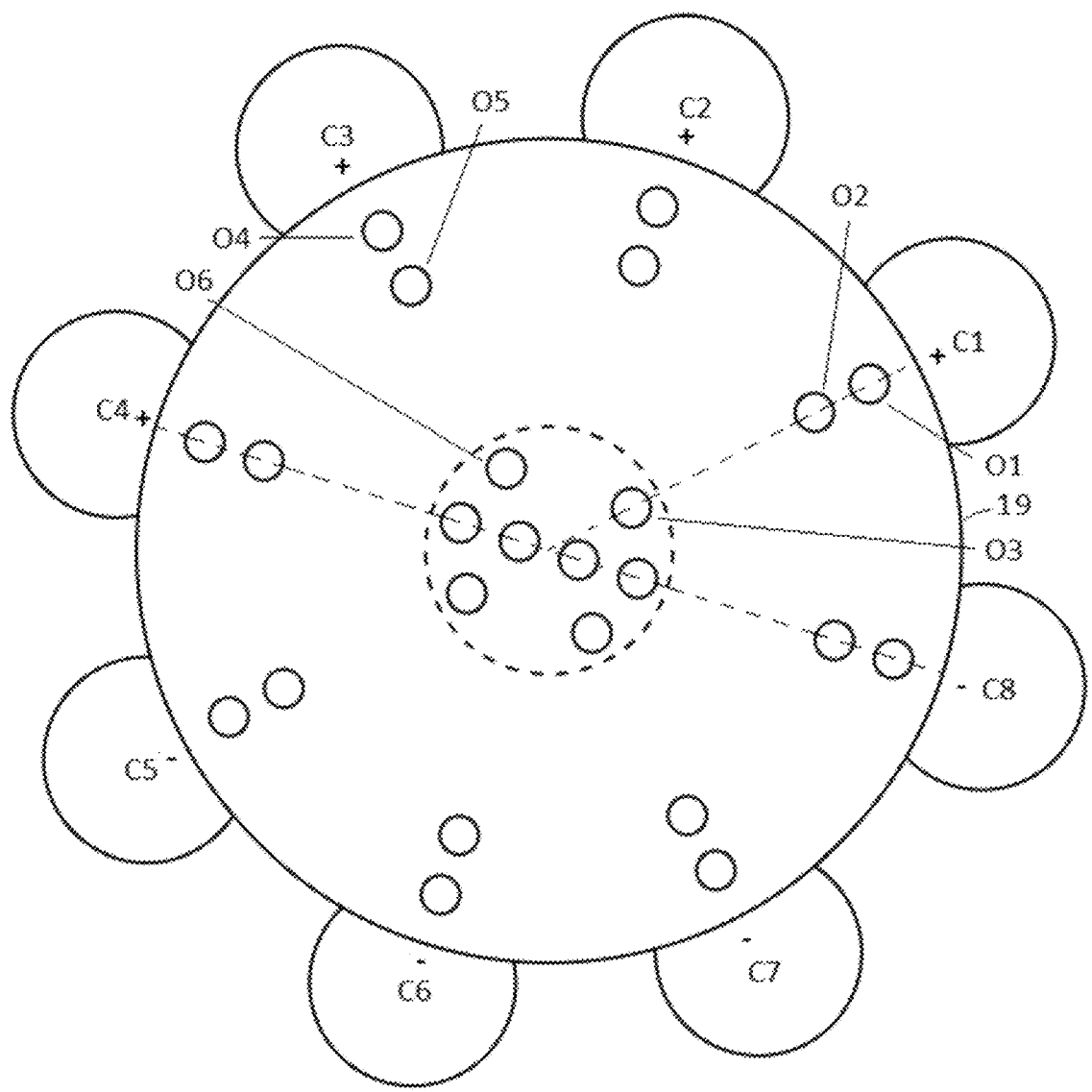
FIG. 6 is a top view illustrating openings in the rotor plate, as well as the columns.

Referring to FIG. 6, the rotor plate's opening cut pattern (viewed from the top) is shown for a 4 inlet stream, 4 outlet stream and 8 column system. The columns are identified as C1 to C8. Of those 8 columns, 3 consecutive columns C1, C2, C3 are used for adsorption from a feed stream, and 3 consecutive columns C5, C6, C7 are used for desorption with a regeneration stream. The adsorption columns and desorption columns are separated by a purge column at both ends (i.e. columns C4 and C8). There are two openings on the rotor plate acting as the inlet and outlet for each column, for example openings O1 and O2 for column C1. The feed stream is supplied from opening O3, flows through a rotor external pipe to opening O2, exits to column C1, and flows upward in column C1 and return to opening O1.

It is necessary that inlet and outlet openings for all columns, such as O1 and O2 for column C1, and openings O4 and O5 for column C3, have the same shapes and relative radial locations, and are equally spaced circumferentially, in order for all rotor plate openings and stator plate openings to be aligned after a rotor rotation.

It is preferable that adsorption columns and desorption columns have opposite flow directions, in order to approach an optimized counter-current flow pattern. FIG. 6 shows that columns C1 to C3 have all upward flows (+) and columns C5 to C7 have all downward flows (−). To allow opposite flow directions, it is preferable that inlet and outlet openings for all columns, such as O1 and O2 for column C1, O4 and O5 for column C3, are aligned radially, equally spaced circumferentially, and form a concentric outer ring such as O1 and O4, and a concentric inner ring such as O2 and O5. The alignment of internal pipes such as O3 and O6 are not as critical.

Figure 7:
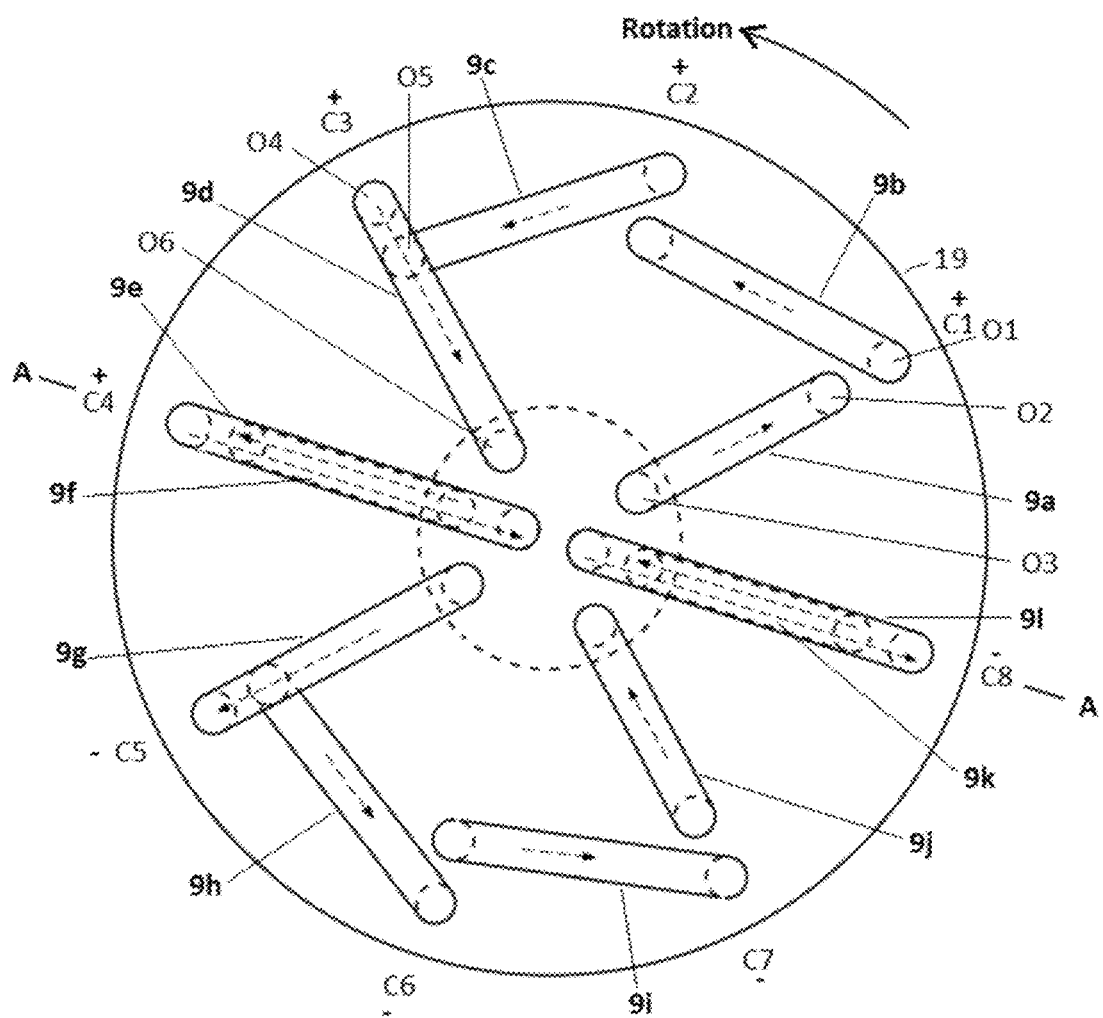
FIG. 7 illustrates fluid flow directions within external pipes of the rotor plate.

Referring to FIG. 7, fluid flow directions within external pipes 9 of the rotor 12 are shown. A process feed stream flows through a feed pipe, a nozzle on the head, an internal fluid section, an internal pipe, and exits to opening O3. It then flows in external pipe 9a to opening O2, exits to column C1 through the stator plate 16, flows upward (+) in column C1, and returns to opening O1. The feed stream continues its flow path through external pipe 9b, exits to column C2, flows upward (+) in column C2, returns to external pipe 9c, exits to column C3 through opening O5, flows upward (+) in column C3, returns to opening O4, flows through external pipe 9d, and returns to internal head volume through opening O6. It further goes through an internal pipe, an internal fluid section, an exit nozzle and an exit pipe to exit the whole apparatus 10.

In order to allow all three desorption columns C5, C6 and C7 to flow consecutively down ward, the external pipes 9g, 9h, 9i and 9j associated with them must be routed specifically. The external pipes 9g, 9h, 9i and 9j should be mirror images of the external pipes 9d, 9c, 9b and 9a, respectively, with the mirror plane cut at the A-A location (illustrated in FIG. 7) and vertical to the rotor plate 19.

A regeneration fluid stream enters the apparatus 10 through a feed pipe, a nozzle 28 on the head 18, an internal fluid section 36, an internal pipe 34, and exits to external pipe 9g, flows to column C5 through the stator plate 16, flows downward (−) in column C5, and returns to external pipe 9h. It then exits to column C6, flows downward (−) in column C6, and returns to external pipe 9i. It further exits to column C7, flows downward (−) in column C7, returns to external pipe 9j, and flows back to the internal head volume. It continues through an internal pipe 34, an internal fluid section 36, an exit nozzle 30 and an exit pipe to exit the whole apparatus 10.

Column C4 is purged with external pipes 9e and 9f. Pipe 9f is below pipe 9e, however, such a spatial arrangement is only optional as the locations of openings to the internal pipes (the inner end of the pipe 9f and 9e) are not critical. Column C8 is similarly purged.

After a fixed time interval of operation, the rotor 12 is turned 45 degrees counterclockwise when viewed from top as shown in FIG. 7. For every two 45 degree turns, a most loaded adsorption column is switched from adsorption to purge and then to regeneration, and a cleanest desorption column is switched from regeneration to purge and then to adsorption.

An adsorption or ion exchange operation transfers targeted material from a process stream to a regeneration stream. The effectiveness of the operation is indicated by concentration levels in the feed/product streams. Column C1, which has been in adsorption mode the longest and is the most saturated column in the previous period, is now switched to regeneration mode after two 45 degree rotor turns (after purging). It is contacted by a regeneration stream that has already contacted 2 desorption columns and has highest concentration of targeted material. The regeneration stream exits the system with highest concentration, helped by such a counter-current operation.

Column C5, which has been in regeneration mode the longest and is the cleanest column in the previous period, is now switched to adsorption mode after two 45° turns. The process stream that has been adsorbed by 2 adsorption columns is further adsorbed by this cleanest column, and exits the system with lowest concentration of targeted material.

By continuously turning the rotor 45 degrees at a fixed time interval for 8 times, each column will go through adsorption 3 times with increasing concentration of solute on its adsorbent, and desorption 3 times with decreasing concentration of solute on its adsorbent.

If the reference frame is chosen to rotate with the rotor, an observer on the rotor would observe counter-current flow of solid versus fluid both in the adsorption columns and in the regeneration columns. Such a countercurrent adsorption and desorption process is more efficient in terms of product purity and regeneration stream usage.

The system performance is further optimized since the feed stream is always up-flow inside adsorption columns and the regeneration stream is always down-flow inside desorption columns. The countercurrent flow exists not only in terms of columns in series, but also exists in the length of each individual column.

An advantage of countercurrent flow in an individual column length can be illustrated by looking at column C1 while the rotor makes two 45 degree turns. After 3 previous periods of adsorption, column C1 has the highest solute concentration overall among columns C1, C2, and C3 in the adsorption series. Moreover, the bottom of column C1 has a higher solute concentration than the top of column C1 does, since the process stream is up-flow and enters the column bottom with the highest solute concentration. Now, once the rotor makes two 45 degrees turns, column C1 becomes the newest column in the regeneration column series. Since the regeneration stream is down flow in the columns, the highest solute concentration zone at the bottom of column C1 will be immediately regenerated, creating the highest concentration of regeneration stream. However, if the regeneration stream was also up flow through column C1, the highest concentration zone would need to be purged from bottom of column C1 to the top of column C1, through the entire length of the column, before the solute can be desorbed out of the top of column C1. Such an operation reduces the efficiency of operation and concentration of regeneration stream.

Therefore, a design provided with the present invention allows both countercurrent flow in a series of columns and countercurrent flow in the column length of each individual column.

Such operation mechanisms are also applicable to a regenerative heat transfer operation. A heat exchange operation transfers thermal energy from a process stream to a regeneration stream. The effectiveness of the operation is indicated by temperatures in the feed/product streams. By applying counter-current operation principles as described previously for adsorption/ion exchange, a regenerative heat exchanger of FIG. 1 design allows high exit temperature for the regeneration stream, and low exit temperature for the process stream, if transfer of thermal energy from process stream to regeneration stream is desired.

Instead of multiple columns, the apparatus could also be constructed with a single large column with multiple sections. The sections are separated by plates in radial direction. The rotor, connection pipe openings, internal and external pipes are also of the same design as the case of multiple columns.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:
1. A rotary fluid distribution apparatus comprising:
   a rotor having a rotor plate, a plurality of external pipes fixed on a top surface of said rotor plate, a plurality of internal pipes extending downwardly from said rotor plate, and a plurality of separation plates, each of said plurality of external pipes having first and second ends opening to a bottom surface of said rotor plate, said plurality of internal pipes extending downwardly from said rotor;

a stator having a head and a plurality of external pipes, said plurality of internal pipes of said rotor being received in an interior of said head, said plurality of external pipes of said stator opening to said bottom surface of said rotor plate so as to align with said plurality of external pipes of said rotor; said head of said stator having a plurality of chambers therein, said plurality of chambers being separated by said plurality of separation plates of said rotor, each of said plurality of chambers having a nozzle in fluid communication therewith, said nozzle being suitable for introducing or removing a fluid from the apparatus, each of said chambers being in fluid communication with one of said plurality of internal pipes of said rotor; and a plurality of columns connected to said plurality of external pipes of said stator, said plurality of columns being packed with a solid material, wherein each of said plurality of columns is connected at a top end to one of said plurality of external pipes of said stator and connected at a bottom end to another of said plurality of external pipes of said stator.

2. The apparatus of claim 1, further comprising:

a stator plate forming a top surface of said stator, said stator plate having openings therein in fluid communication with said plurality of external pipes of said stator, said openings of said stator plate matching the openings of said rotor plate to allow fluid communication between said external pipes of said rotor and said external pipes of said stator.

3. The apparatus of claim 1, said plurality of external pipes of said rotor comprising:

a set of external pipes oriented to establish downward flow through respective columns of said plurality of columns to which the set of external pipes is in fluid communication with;

a first pair of external pipes oriented to purge a column of said plurality of columns to which the pair of external pipes is in fluid communication with;

a set of external pipes oriented to establish upward flow through respective columns of said plurality of columns to which the set of external pipes is in fluid communication with; and a second pair of external pipes oriented to purge a column of said plurality of columns to which the pair of external pipes is in fluid communication with.

4. The apparatus of claim 3, said rotor being rotatable relative to said stator so as to selectively establish an upward flow, a downward flow or a purge in a particular column of said plurality of columns.

5. The apparatus of claim 3, wherein the orientation of said set of external pipes oriented to establish downward flow is a mirror image of said set of external pipes oriented to establish upward flow.

6. The apparatus of claim 5, the mirror images being symmetric with respect to a line formed by centers of openings in said rotor plate associated with the first and second pairs of external pipes oriented to purge a column.

7. The apparatus of claim 1, each of said internal pipes of said rotor extending through one or more of said plurality of separation plates so as to open in a respective chamber of said head of said stator.

8. The apparatus of claim 1, said solid material of said plurality of columns being a thermal energy transfer medium or a mass transfer medium.

9. The apparatus of claim 1, wherein each of said nozzles has a tube extending outwardly therefrom.

10. The apparatus of claim 1, said plurality of openings in said rotor plate being equally spaced circumferentially about said rotor plate, said plurality of openings in said rotor plate comprising:

a concentric outer ring of openings; and a concentric inner ring of openings radially aligned with said concentric outer ring of openings.

* * * * *